United States Patent [19]

Black et al.

[11] Patent Number: 5,715,260
[45] Date of Patent: Feb. 3, 1998

[54] METHOD AND APPARATUS FOR PROVIDING A VARIABLE RESET INTERVAL IN A TRANSMISSION SYSTEM FOR ENCODED DATA

[75] Inventors: Jeffrey T. Black, Wellesley, Mass.; Jeffrey A. Weiss, Smithfield, R.I.

[73] Assignee: Telco Systems, Inc., Norwood, Mass.

[21] Appl. No.: 489,328

[22] Filed: Jun. 12, 1995

[51] Int. Cl.[6] ............................ G06F 11/00; H04L 12/00
[52] U.S. Cl. ........................ 371/47.1; 371/5.1; 371/5.4
[58] Field of Search ........................ 371/5.1, 5.4, 47.2, 371/47.1, 37.1, 41, 32, 33, 35, 37.7, 57.1, 61, 62; 341/60, 94; 380/48; 375/364, 368, 357, 358, 359

[56] References Cited

U.S. PATENT DOCUMENTS

| | | | |
|---|---|---|---|
| 3,571,794 | 3/1971 | Tong | 340/146 |
| 3,641,494 | 2/1972 | Perrault et al. | 340/146 |
| 4,654,480 | 3/1987 | Weiss | 380/48 |
| 4,701,923 | 10/1987 | Fukasawa et al. | 371/41 |
| 4,841,526 | 6/1989 | Wilson et al. | 371/32 |
| 4,939,731 | 7/1990 | Reed et al. | 371/32 |
| 5,130,993 | 7/1992 | Gutman et al. | 371/42 |

*Primary Examiner*—Phung Chung
*Attorney, Agent, or Firm*—Wolf Greenfield & Sack, P.C.

[57] ABSTRACT

A method and apparatus for reducing the amount of corrupted data in a system for transmitting encoded data across a network, which system requires sychronization between encoding and decoding nodes, the method and apparatus involving (a) providing an indication of the reliability of the channel between the encoding and decoding nodes; (b) performing automatic resets at the nodes at intervals I; and (c) utilizing the indication of channel reliability to control the interval I. The interval I may be determined, for example, by the error rate on the channel for one or more preceding time interval S, and may be determined at either the encoding or decoding node.

22 Claims, 2 Drawing Sheets

METHOD AND APPARATUS FOR PROVIDING A VARIABLE RESET INTERVAL IN A TRANSMISSION SYSTEM FOR ENCODED DATA

FIELD OF THE INVENTION

This invention relates to transmission systems for encoded data and more particularly to such a system which reduces the amount of corrupted data in the system while controlling processing overhead and maintaining encoding efficiency by providing variable reset intervals for encoder synchronization, which intervals are based on detected error rate.

BACKGROUND OF THE INVENTION

For reasons including improved bandwidth and/or security, it is common for data being transmitted over various transmission media to be encoded in some way, such encoding normally involving compression, encryption, or both. Many of the more sophisticated compression algorithms, such as Lempel-Ziv 77 (LZ77) and Dynamic Huffman encoding, and many sophisticated encryption algorithms, involve the use of matching data buffers, dictionaries, tables and the like (sometime hereinafter collectively referred to as context) at both the transmitting/encoding node and the receiving/decoding node, which context must be maintained in synchronization in order for the encoded data to be correctly decoded. Any loss of synchronization of the context between the encoding and decoding nodes generally results in the corruption of all data received after the loss of synchronization occurs.

In order to preserve the integrity of received encoded data, various protocols have therefore been developed to maintain the context at the encoding and decoding nodes in synchronization. These protocols have generally involved including an error detection code, such as parity bits or cyclic redundancy code (CRC) with the coded data, with an error detected through one of these techniques being utilized as an indication that a loss of synchronization may have occurred. The error detection coding may be included in the data prior to encoding, with the data then being decoded prior to performing an error detection check at the receiving/decoding node, or the error detection code may be added to the encoded data at the transmitting node, with error detection being performed at the receiving node prior to decoding. In these systems, when an error is detected at a receiving node, a reset request is sent through a back channel to the encoding node. The encoding node, when it receives this request, recognizes that a loss of synchronization has occurred and initiates a resynchronization sequence. This may, for example, involve clearing a history buffer and/or various tables, dictionaries and the like and restarting these context items at, depending on the coding, at least the transmitting node, and frequently both nodes, to restore data synchronization. In environments where loss of data is unacceptable, this may also result in the retransmission of the data in which the error was detected and in all subsequently transmitted data which may have been corrupted by the lack of synchronization. In other environments, an effort may be made to reconstruct all or a part of the corrupted data in some other way, or the corrupted data may merely be discarded.

However, the protocol described above has several limitations. The first limitation is that if the channel is in fact not totally reliable, the reset request on the back channel may for some reason not reach the encoding station, resulting in the transmission of corrupted data for an extended period of time until the situation can be corrected. However, even if the reset request is properly received, the time period between the original message being transmitted by the encoding station and the encoding station receiving the reset request may be substantial, resulting in large amounts of corrupted data being transmitted which must then be either retransmitted or lost. Neither retransmission nor loss of large amounts of data is desirable. The reason for the time delay in receiving reset requests is that the nodes on the network may be widely separated, with there frequently being many intermediate nodes. For example, in a telephony environment, the sending and receiving nodes may be in different states, different countries or even different continents. The message may also pass through various end offices and central offices of the telephone system in its path from one node to the other. Furthermore, transmissions may be made via satellites, requiring propagation delays of hundreds of milliseconds. Even though electronic transmissions are rapid, it can take on the order of milliseconds or more for the encoded message to pass through intermediate nodes to the receiving/decoding node, for the decoding node to recognize the error and produce the reset request and for the reset request to be sent back through the network, including the intermediate nodes, to the original transmitting/encoding node. At the speeds of modern communication systems, dozens or even hundreds of frames of data could be transmitted during such an interval.

In order to correct the first of the problems indicated above, U.S. Pat. No. 5,130,993, issued to Gutman et al on Jul. 14, 1992, teaches the receiving/decoding node starting a timer when it sends a reset request, and sending a second reset request if a reset indication has not been received when the timer times out. The timer would be set for some reasonable number of frames, depending on the normal time required for a reset request to be responded to. This patent also teaches that the first problem may be dealt with by, in addition to performing resets on the context at the two nodes when a reset request is received as the result of a detected error, also performing periodic resets every N frames. For the embodiment disclosed in the patent, resets are performed every nine frames. This means that regardless of how long it takes for a reset request to be generated and to reach the original transmitting/encoding node, and even if such reset request is not received, no more than nine corrupted frames will be transmitted before a reset occurs, and in most instances less than this number of frames will be transmitted, thereby minimizing the amount of corrupted data which will need to be either retransmitted or lost.

However, this solution is not ideal for two reasons. First, resets impose an overhead burden on the system which reduces the rate at which data can be transmitted. The more often resets are performed, the more the average data rate on the system is reduced. Second, particularly for compression, the degree of compression which can be achieved is a function of the size of a history buffer which is used and of the various dictionaries/tables of the context. Thus, when the context elements are reset, and then regenerated, there is a loss of compression ratio during the transition periods. Thus, the more often the context are reset, the lower the overall compression ratio which is achievable by the system. Frequent reset can also reduce encoding efficiency for other types of encoding.

Thus, there is a critical tradeoff in selecting the interval between automatic resets in such a system, it being desirable that such intervals be short enough so as to minimize the amount of data which either must be retransmitted or lost, while being long enough so as not to adversely affect the data rate and encoding efficiency/compression ratio for the system. In particular, for a real or virtual channel which is experiencing low error rate, it would be desirable for the interval between automatic resets to be relatively long so as to minimize the adverse effects on data rate and encoding efficiency caused by the resets, while for unreliable channels experiencing frequent errors, shorter intervals between automatic resets may be more desirable. A need therefore exists for an improved system which permits substantial optimization of automatic reset intervals to be achieved in response to the current condition of the channel over which the data is being transmitted without requiring outside human intervention.

SUMMARY OF THE INVENTION

In accordance with the above, this invention provides a method and apparatus for reducing the amount of corrupted data in a system for transmitting encoded data across a network while controlling the processing overhead and encoding efficiency (i.e. compression ratio) by adjusting the number of resets which are automatically performed during a given interval based on the detected reliability or error condition of the relevant channel. In particular, error detection information is included with the transmitted encoded data. As previously indicated, this error detection information may be added to the data either before or after encoding. Further, the encoding may be for compression, encryption, or other purposes, but requires that synchronization be maintained between encoding and decoding nodes to avoid corruption of the data. The encoding node may also receive an indication of errors detected at the receiving node. The number of error indications R is counted at the encoding node or decoding node during at least one selected interval S. The encoding node is automatically reset at intervals I with the number R of received error indications for interval $S_n$ being utilized to control the duration of the interval I for the subsequent interval $S_{n+1}$. If required, the decoding node may then also be reset in data synchronization with the encoding node (for example when the first reset frame is received). For preferred embodiments, the error indication received at the encoding node is a reset request with appropriate resets also being performed at the nodes in response to such a reset request.

For a preferred embodiment, the interval I is increased by a selected amount if R=0 for the interval $S_n$. A selected maximum M may be provided beyond which the interval I cannot be increased or I may be permitted to increase to infinity. For the preferred embodiment, the interval I is decreased by a selected amount if R is greater than 0 for the interval $S_n$. A minimum L may be provided below which the interval I cannot be decreased, with L being one for a preferred embodiment. Further, if R is greater than a threshold value T for an interval $S_n$, the interval I may be set to the minimum value L. For a preferred embodiment, the interval I is expressed as a number of frames, with a frame being an encapsulated packet of data.

The foregoing and other objects, features and advantages of the invention will be apparent from the following more particular description of a preferred embodiment of the invention as illustrated in the accompanying drawings.

DETAILED DESCRIPTION

Figure 1:
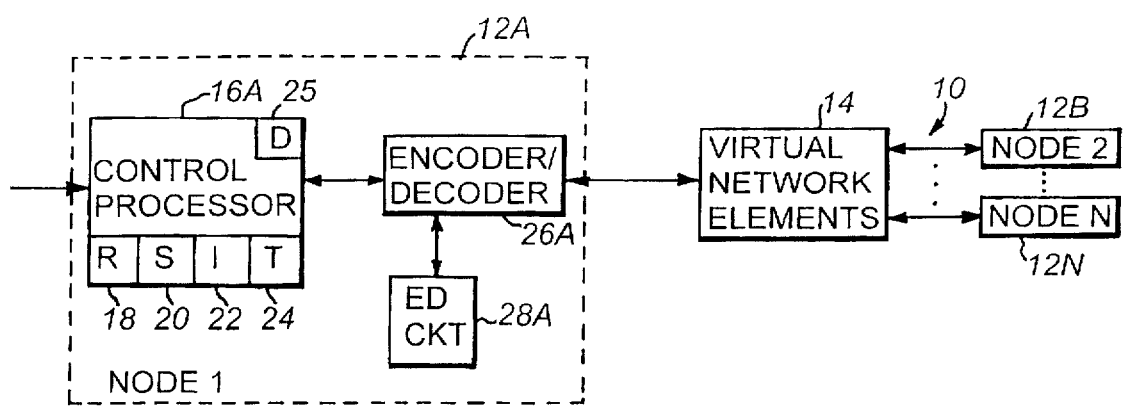
FIG. 1 is a block diagram of an exemplary system in which the teachings of this invention might be utilized.

Referring to FIG. 1, the exemplary system 10 is shown as having a plurality of nodes 12A–12N which are interconnected through virtual network elements 14. Virtual network elements 14 may include copper and/or fiber optic wires, cables, radio links and other data transmission media, as well as relay stations, end offices, central offices, and other intermediary facilities of the network being used. The network may, for example, be a standard telephony network where the nodes on the network may be in the same building or may be separated by hundreds or even thousands of miles. Thus, the nodes may be in different states, different countries or even different continents. Network elements 14 are referred to as virtual network elements since the actual network from node 1 to node 2 is established in response to a message from node 1 addressed to node 2 and the network ceases to exist when transmission of messages between these two nodes is complete. The various elements of the network may also be of different quality and various links in the network may be subject to spurious noise, traffic overloads and other error sources which can result in significant differences in the error rate between the two nodes over time. Differences in the error rate between two nodes over time may also result from the fact that the virtual network will not necessarily utilize a fixed physical path between two nodes, particularly when the nodes are relatively far apart and there may be an almost infinite number of different ways in which a path may be established between the two nodes. Thus, the virtual path established for a given message or data may depend on line availability based on other traffic in the system and other factors, with the particular path chosen for a given message influencing the error rate for the message. Thus, a system which performs automatic resets at fixed time intervals for the entire system, regardless of path length, path quality and other factors which may contribute to error rate, will inevitably be imposing undue overhead and encoding efficiency burdens on the system, thereby reducing both throughput and available encoding efficiency/compression ratio for some groups of messages, while not resetting often enough to avoid the requirement for significant retransmission of data and/or significant data loss for other traffic through the network. As discussed earlier, this invention overcomes these problems by providing an adaptive interval for the automatic resets.

In practicing the invention, each node 12 includes a control processor 16A–16N, with only the control processor 16A for node 1 being shown in the figure. Each processor includes as part thereof an R counter 18, an S counter 20, an I counter 22, and a T register 24. An interval (D) counter 25 is also provided which tracks the number of frames since the last reset (or automatic reset), and, where appropriate, L and M registers may also be provided (not shown). Each node also includes an encoder/decoder element 26A–26N and an error detection circuit or element 28A–28N (with only the elements 26A and 28A being shown in the figure). Encoder/decoder 26 and error detector 28 may be separate hardware or software devices or the encoder/decoder function and error detection function may be performed in software in the control processor 16. The encoding/decoding function may be for purposes of compressing data, encrypting data or some combination thereof or may be for other encoding purposes known in the art. However, when practicing the teachings of this invention, the encoding and decoding process will be such that synchronization of buffers, dictionaries, tables and/or other context elements are required in order for the encoder data to be properly decoded, so that any loss of synchronization between the context of the two nodes will result in corrupted, useless data. Where the encoding/decoding is for compression purposes, examples of techniques in which the teachings of this invention could be employed include various Lempel-Ziv 77 compression techniques and various Dynamic Huffman encoding techniques.

Figure 2:
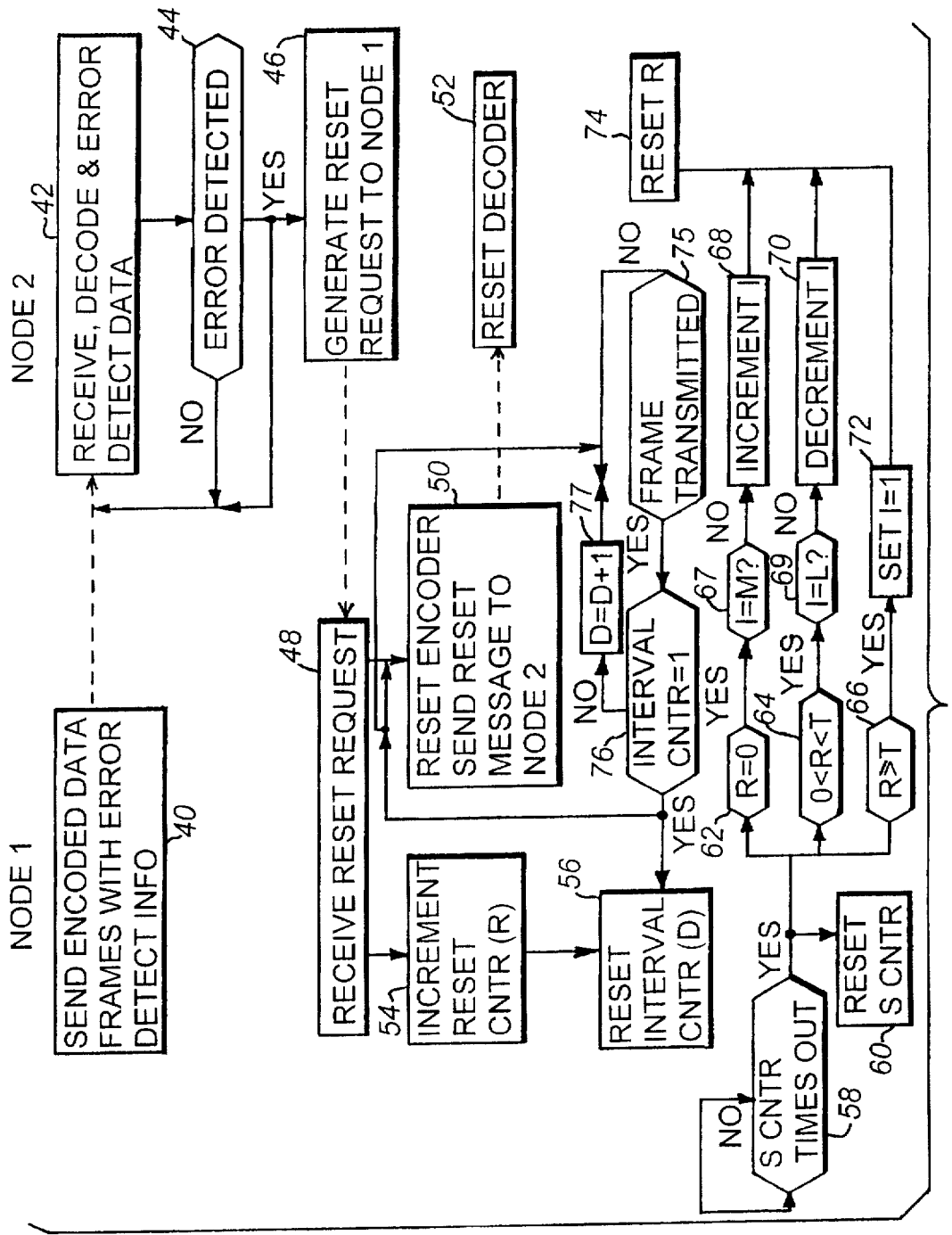
FIG. 2 is a flow diagram of the process for maintaining synchronization between the encoder/decoder context at an encoding and decoding node in accordance with the teachings of this invention.

In operation, referring to FIG. 2, it is seen that when node 1 has a message to transmit, which message may either be generated by control processor 16A or other equipment at node 1, or may be received at node 1 from another source for transmission, node 1 encodes the data in encoder 26A and causes the error detect information to be added to the message by error detect circuit 28A. The error detect information may be added either before encoding and be encoded with the transmitted message, or may be added to the message after encoding. For the preferred embodiment, messages are sent as encapsulated packets or frames, with each such packet or frame including, in addition to the data being transmitted, the address to which the message is being directed and the error detection information. The length of each frame can vary with the transmission medium and transmission protocol being utilized, being for example as little as 64 bytes in Ethernet applications to over 8,000 bytes in other applications. Frame sizes outside this range are also possible for networks or applications which are not commonly used at this time. Each of these frames of data, which frames are formed in standard ways which do not form part of the present invention, are transmitted during step 40.

During step 42, the encoded message is received at node 2, which may for example be the node 12B in FIG. 1, where the message is decoded by the encoder/decoder circuit 26 at that node, and error detection is performed by the appropriate error detect circuitry 28. If no error is detected during step 44, node 2 continues to receive data. If an error is detected during step 44, the operation proceeds to step 46 to generate a reset request to node 1. While FIG. 2 also indicates that node 2 continues to receive data after an error is detected, it should be realized that this data is corrupted, since it cannot be reliably decoded. Therefore, this data may not in fact be received or, if received, may be discarded. Alternatively, some effort may be made to retrieve what can be retrieved from this data so as to avoid the need for retransmission.

The reset request generated during step 46 is received at node 1 during step 48. The receipt of the reset request at node 1 causes two things to happen. First, during step 50, the context for the encoder at node 1 are reset and, if required, or otherwise desired, an appropriate message is sent to node 2 to reset its context in synchronism with that for node 1. This reset message is received at node 2, causing the decoder context at this node to be reset to restore synchronism between the encoder/decoders at the two nodes during step 52. For some coding, such as LZ77, a resetting at the decoding node is not required since inputs are always clear data or offsets which go only to received data in the reset region. Therefore, for these codes, step 52 may be omitted if desired.

The receipt of a reset request also causes the reset counter 18 for processor 16A at node 1 to be incremented during step 54. Normally the reset counter is incremented by 1 for each reset request received. From step 54, the operation proceeds to step 56 to reset the D or interval counter 25. While step 56 is optional at this point, it is considered preferable since it keeps the number of resets being performed by the system from being significantly increased above the determined reset interval even if some error indications are received. However, since once an error occurs, the likelihood of successive errors occurring as a result of noise, congestion or other spurious error sources is significantly increased, it may be desirable in at least some applications not to reset the interval counter 25 at this point in the operation since a shortened time interval to the next reset after an error is detected may reduce the likelihood of having to either resend significant data or have significant data lost. The tradeoff on whether to include step 56 at this point will be based on a system designer's decision as to whether the likelihood of an additional error occurring after an initial error detection is sufficiently large so as to make a reduced automatic reset interval at this point desirable even though this will result in some slight decrease in throughput and compression/encoding rate.

While the various operations described above are being performed, S counter 20 continues to run. S counter 20 may be a clock, or may be a frame counter, byte counter or the like. The interval of S counter 20 may be in the order of seconds and therefore orders of magnitude longer than the duration of a typical frame. During step 58, a determination is continuously or periodically made as to whether the S counter has timed out. If the S counter has not timed out, the counter continues to run and continues to be monitored during step 58.

When S counter 20 does time out, a "yes" output is obtained from step 58 which causes a number of operations to be performed. In particular, during step 60, S counter 20 is reset to start another S count interval. Depending on the nature of counter 28, this step may not be required. At this time, determinations are also made as to whether R (i.e. the count in the R counter 18, which count is indicative of the number of reset requests during the just completed S interval) is equal to zero during step 62, whether R is between zero and a threshold value T during step 64 and whether R is equal to or greater than T during step 66. If R is equal to zero at the end of the time interval S, it means that no errors were detected during the preceding time interval S so that the virtual network between the two nodes is substantially error free. When this occurs, the operation proceeds to step 67, which step is optional, to determine if I is equal to some maximum value M. Without step 67, there is no maximum and I may theoretically go to infinity. From step 67 if a "no" output is obtained, or from step 66 if step 67 is not performed, the operation proceeds to step 68 to increment the value for I (i.e. the interval between automatic resets) in counter 22 by a selected amount. For a preferred embodiment, I is an indication of the number of frames between automatic resets and the value of I is incremented by one during step 68.

If the value of R is between zero and T, there is a "yes" output from step 64 indicating that at least one error was detected during the preceding time interval S, but that the number of errors detected is less than the threshold value T. For the preferred embodiment, the threshold value T for a time interval S of 5 sec is ten. A "yes" output during step 64 results in step 69 being performed to determine if I is already at its minimum value, which value is one for a preferred embodiment. If a "no" output is obtained during step 69, the value of I is decremented by a selected amount during step 70, this amount being by one frame for the preferred embodiment. Finally, if there is a "yes" output during step 66, this means that there were substantial errors on the line during the preceding time interval S (i.e. ten or more for a preferred embodiment) so that the virtual network is not very reliable. Under these circumstances, the operation proceeds to step 72 to set I to a predetermined minimum value L which, for the preferred embodiment, is one frame. Thus, for a very noisy virtual link between two nodes, resets occur between each frame until a determination is made that the line has become more reliable. From steps 68, 70 or 72, the operation proceeds to step 74 to reset the R counter 18 in preparation for the beginning of the next S interval.

As the steps indicated above are being performed, processor 16A is also monitoring to determine if a frame has been transmitted (step 75). When, at the end of a frame, a "yes" output is obtained during step 75, step 76 is performed to determine if the interval counter 25 is equal to the current value stored for the interval I in counter 22. If a "no" output is obtained during step 76, then step 77 is performed to increment the interval counter 25 and, for the preferred embodiment, another frame of data is transmitted and step 76 is again performed to see if the interval I has passed. When, during step 76, a "yes" output is obtained, two operations occur. First, step 56 is performed to reset interval counter 25. Second, step 50 is performed to reset the encoder context and to send a reset message to node 2 to cause the decoder context at this node to be reset during step 52 in data synchronism with the transmitting node. Further, from a "yes" output during step 76, the operation returns to step 75 to test for the transmission of a frame, and to steps 76 and 77 to increment the interval counter and to test the D value against I until a determination is again made that the interval counter is equal to I and another automatic reset is performed.

A system is thus provided which optimizes the performance of automatic resets in a transmission system for encoded data based on the experienced error rate in the virtual channel interconnecting the nodes. More generally, the interval for performing automatic resets is controlled as a function of the reliability of the channel interconnecting the encoding and decoding nodes. Thus, while variations in the value I are made based solely on the number of detected errors during a preceding interval S for the preferred embodiment, these variations could be controlled in response to a finite input response filter or an infinite input response filter so as to be responsive to what occurs during a larger number of prior intervals. Further, while the interval determination is made at the transmitting/encoding node for the preferred embodiment in response to error indications received from the decoding node, the automatic reset intervals could also be determined at the decoding node, with all resets from the encoding node being in response to reset requests received from the decoding node, these reset requests being either in response to detected errors, as is currently the case, or automatic reset requests. One potential advantage of determining automatic reset interval at the decoding node is that lost resets do not affect the determined interval. However, it may be desirable to store a determined reset interval at the encoding node to avoid potential loss of automatic reset signals. Particularly if the determination of automatic reset interval I is performed at the receiving node, any of a variety of error indication protocols currently employed, or which may be developed in the future, for providing an indication of channel reliability, including, but in no way limited to, redundancy or CRC codes included with data packets, sequence codes which detect a missing packet, etc. Further, in areas where high reliability is required, the threshold for setting I to one may be very low, for example a single error during a given interval S, while in other, less secure applications, the threshold feature may be eliminated completely. The amount by which incrementing and decrementing is done, and whether such incrementing or decrementing occurs at the end of each interval S, are based on two or more consecutive intervals which are, for example, error free, etc. are also design choices which may vary with application and environment. Thus while a particular implementation has been shown for incrementing, decrementing and resetting the automatic reset intervals, this implementation is by way of example only for a particular environment and is not to be considered a limitation on the invention. The specific way in which the reset interval will be incremented, decremented, set or reset will depend on the environment in which the system is being utilized and on desired performance criteria and will therefore vary with the application and environment for the system. However, in accordance with the teachings of the invention, the intervals for the resets will be varied at selected intervals based on a detected or otherwise determined error rate/channel reliability for the channel over which the data is being transmitted.

Thus, while the invention has been particularly shown and described above with reference to preferred embodiments, the foregoing and other changes in form and detail may be made therein by one skilled in the art without departing from the spirit and scope of the invention.

What is claimed is:

1. In a system for transmitting encoded data across a network, the encoding being such that synchronization must be maintained between contexts at encoding and decoding nodes to avoid corruption of the data, a method for reducing the amount of corrupted data in the system while maximizing coding efficiency, comprising the steps of:
   (a) including error detection information with transmitted encoded data;
   (b) receiving at an encoding node an indication of errors detected at the corresponding decoding node;
   (c) counting the number of received error indications R at the encoding node during a selected interval S;
   (d) automatically resetting the context at at least the encoding node at intervals I of variable duration; and
   (e) utilizing the number R for the interval $S_n$ to control the durations of the intervals I for the subsequent interval $S_{n+1}$.

2. A method as claimed in claim 1 wherein each indication of error received at the encoding node is a reset request, and including the step of also resetting context at at least the encoding node in response to a reset request.

3. A method as claimed in claim 2 including the step of resetting an interval counter (D) in response to the receipt of a reset request at the encoding node.

4. A method as claimed in claim 1 wherein step (e) includes the step of increasing each interval I by a selected amount if R equals zero for the interval $S_n$.

5. A method as claimed in claim 4 wherein each interval I cannot be increased beyond a selected maximum M.

6. A method as claimed in claim 4 wherein each interval I can be increased to infinity.

7. A method as claimed in claim 1 wherein step (e) includes the step of decreasing each interval I by a selected amount if R is greater than zero for the interval $S_n$.

8. A method as claimed in claim 7 wherein each interval I cannot be decreased below a selected minimum L.

9. A method as claimed in claim 8 wherein L is equal to one.

10. A method as claimed in claim 8 wherein, if R is greater than a threshold value T for an interval $S_n$, each interval I is set to L.

11. A method as claimed in claim 10 wherein L is equal to one.

12. A method as claimed in claim 1 wherein the encoded data is compressed data and the synchronization is to be maintained between compression dictionaries.

13. A method as claimed in claim 1 wherein each interval I is a number of frames of data between automatic resets.

14. A method as claimed in claim 1 including the step of resetting the context at the decoding node in data synchronization with the context at the encoding node.

15. In a system for transmitting encoded data across a network, the encoding being such that synchronization must be maintained between contexts at encoding and decoding nodes to avoid corruption of the data, a method for reducing the amount of corrupted data in the system while maximizing coding efficiency, comprising the steps of:
- (a) providing an indication of the reliability of the channel between the encoding and decoding nodes;
- (b) automatically resetting the context at the encoding node at intervals I of variable duration; and
- (c) utilizing the indication of reliability to control the duration of the intervals I.

16. A method as claimed in claim 15 including the step of resetting the context at the decoding node in data synchronization with the context at the encoding node.

17. A method as claimed in claim 15 wherein the indication of reliability during step (a) is provided at the encoding node; and wherein step (c) is performed at the encoding node.

18. A method as claimed in claim 15 wherein the indication of reliability during step (a) is provided at the decoding node; and wherein step (c) is performed at the decoding node.

19. A method as claimed in claim 15 wherein the indication of reliability is an indication of errors on the channel during a selected interval S, and wherein during step (c) the duration of the interval I is controlled based on the indication of errors for the preceding interval S.

20. A method as claimed in claim 15 wherein the indication of reliability is an indication of errors on the channel during a selected interval S, and wherein during step (c) the value of I is controlled based on the indication of errors for a selected plurality of preceding interval S.

21. In a system for transmitting encoded data across a network, the encoding being such that synchronization must be maintained between contexts at encoding and decoding nodes to avoid corruption of the data, apparatus for reducing the amount of corrupted data in the system while maximizing coding efficiency, comprising:
- (a) means for providing an indication of the reliability of the channel between the encoding and decoding nodes;
- (b) means for automatically resetting the context at the encoding node at intervals I of variable duration; and
- (c) means for utilizing the indication of reliability to control the duration of each interval I.

22. Apparatus as claimed in claim 21 including means for resetting the context at the decoding node in data synchronization with the context at the encoding node.

* * * * *